US00RE37200E

(19) United States
(12) Reissued Patent
Dunay et al.

(10) Patent Number: US RE37,200 E
(45) Date of Reissued Patent: May 29, 2001

(54) COLOR-STABLE POLYCARBONATE COMPOSITION AND ARTICLES MOLDED THEREFROM

(75) Inventors: Kevin F. Dunay, Bethel Park; Winfried G. Paul; Sivaram Krishnan, both of Pittsburgh, all of PA (US)

(73) Assignee: Bayer Corporation, Pittsburgh, PA (US)

(21) Appl. No.: 09/379,515

(22) Filed: Aug. 23, 1999

Related U.S. Patent Documents

Reissue of:
(64) Patent No.: 5,484,828
Issued: Jan. 16, 1996
Appl. No.: 08/341,793
Filed: Nov. 18, 1994

(51) Int. Cl.[7] ..... C08K 5/34
(52) U.S. Cl. ..... 524/91; 427/384; 427/385.5; 427/407.1; 428/412; 524/83; 524/84; 524/99; 524/100; 524/111; 524/335; 524/338; 524/102
(58) Field of Search ..... 427/384, 385.5, 427/407.1; 428/412; 524/83, 84, 91, 99, 100, 102, 111, 335, 338

(56) References Cited

U.S. PATENT DOCUMENTS 3,892,889 * 7/1975 Cohnen et al. ..... 427/160
4,276,233 * 6/1981 Markezich et al. ..... 528/196
4,563,516 * 1/1986 Schreckenberg et al. ..... 528/196
4,707,393 * 11/1987 Vetter ..... 428/178
4,812,498 * 3/1989 Nakahara et al. ..... 524/91
4,948,666 * 8/1990 Paul et al. ..... 428/334
5,001,177 * 3/1991 Winfried et al. ..... 524/86

FOREIGN PATENT DOCUMENTS

2072193 * 1/1993 (CA) .
1670951 * 2/1971 (DE) .
110221 * 6/1984 (EP) .
2028228 * 3/1980 (GB) .

* cited by examiner

*Primary Examiner*—Terressa M. Boykin
(74) *Attorney, Agent, or Firm*—Joseph C. Gil; Aron Preis

(57) ABSTRACT

A thermoplastic polycarbonate molding composition free from organo phosphorus compounds and having an improved resistance to discoloration caused by exposure to High Intensity Discharge (HID) light and heat is disclosed. Accordingly, the molding composition contains (co) polycarbonate resin, a dimeric benzotriazole and an ester of a 3,5-di-tert-butyl-4-hydroxyhydrocinnamic acid. In a preferred embodiment, a sheet made of (co)polycarbonate resin is rendered improved resistance to discoloration by having applied to at least one of its surfaces an adherent protective film prepared from the polycarbonate composition of the invention.

11 Claims, No Drawings

COLOR-STABLE POLYCARBONATE COMPOSITION AND ARTICLES MOLDED THEREFROM

Matter enclosed in heavy brackets [ ] appears in the original patent but forms no part of this reissue specification; matter printed in italics indicates the additions made by reissue.

FIELD OF THE INVENTION

The invention relates to a polycarbonate composition and to articles molded therefrom; more particularly the invention relates to compositions and articles which have an improved resistance to discoloration caused by exposure to High Intensity Discharge (HID) light and heat.

SUMMARY OF THE INVENTION

A polycarbonate composition having an improved resistance to discoloration caused by exposure to High Intensity Discharge (HID) light and heat is disclosed. Accordingly, the composition which is free from hydroxyphenyl organophosphorus compounds, contains polycarbonate resin, a dimeric benzotriazole and an ester of a 3,5-di-tert-butyl-4-hydroxyhydrocinnamic acid. In a preferred embodiment, a (co)polycarbonate sheet is rendered improved resistance to discoloration by having applied to at least one of its surfaces an adherent film comprising the polycarbonate composition of the invention.

BACKGROUND OF THE INVENTION

Polycarbonate resins are characterized by their transparency, mechanical strength and dimensional stability. These properties make polycarbonate an ideal choice for the preparation of articles, especially laminates or sheets, useful in application in hostile environments. One of the drawbacks of the resin used in this application is its tendency to discolor upon prolonged exposure to the heat and/or UV. Among the relevant applications, mention may be made of lighting lenses and associated parts in conjunction with metal halide, mercury vapor, high pressure sodium and other High Intensity Discharge (HID) lamps which generate UV radiation and significant heat. The tendency of polycarbonate to discolor, limits its applicability and methods to overcome the deficiency have long been sought.

It is therefore an object of the present invention to provide polycarbonate compositions which are suitable for the preparation of articles, most especially sheets and laminates, having improved resistance to discoloration caused by exposure to heat and/or UV.

The art has long recognized the efficacy of hindered phenols as antioxidants in the context of polymeric resins. U.S. Pat. No. 4,563,516 disclosed sterically hindered phenols as stabilizers of a carbonate polymer, and a hindered phenol phosphite was disclosed in U.S. Pat. No. 4,276,233 as a thermal stabilizer of polycarbonate resins. U.S. Pat. No. 4,812,498 disclosed a polycarbonate resin composition having improved resistance to deterioration when exposed to light and containing the bisbenzotriazole stabilizer of the present invention. Importantly, the possible use of the bisbenzotriazole in combination with phenolic antioxidants is disclosed in the '498 document.

The art is noted to include Canadian Patent 1,208,873 which disclosed a polycarbonate-based panel made resistant to UV radiation. Accordingly, a panel is structured to include a core layer of polycarbonate to which there is adhesively bonded an intermediate UV absorption layer and a cover layer. The purpose of the cover layer is to prevent vaporization of the UV absorber from the intermediate layer. The intermediate, UV-absorption layer may be prepared from polycarbonate and contains derivatives of benzotriazole as UV absorbers. Also noted is German Patent Application 1,670,951 which disclosed polycarbonate molded articles, including ribbons which are rendered resistant to UV radiation by incorporating the bis-benzotriazole compound of the present invention therewith. A method for coating a polycarbonate sheet with a protective layer was disclosed in UK Patent Application 2,028,228. A layer preferably of polymethacrylate and advantageously containing a UV absorber is said to be applied to the sheet by co-extrusion. U.S. Pat. No. 3,892,889 discloses UV stabilized polycarbonate moldings, the surfaces of which have been treated with a solution containing a benzotriazole. German DE-OS 3,617,978 discloses co-extruded sheets based on a polycarbonate resin which sheets are covered by a UV absorbing layer made from a branched polycarbonate resin containing the bis-benzotriazole of the present invention. Also relevant is European Patent Application 110,221 which disclosed a panel consisting of a core layer of polycarbonate containing not more than 0.5 wt. percent of a UV absorber and having on at least one side a coating layer which has been coextruded with the core and which contains at least 3 percent of a UV absorber.

U.S. Pat. No. 4,948,666 is noted to disclose a polycarbonate composition containing the bis-benzotriazole of the present invention useful in the preparation of a stain-protective layer for polycarbonate sheets. Also relevant in the present context is U.S. patent application Ser. No. 07/732,262 filed Jul. 18, 1991 which disclosed relevant technology.

The present invention resides in the finding of a particularly efficient combination of stabilizers.

DETAILED DESCRIPTION OF THE INVENTION

The (co)polycarbonate resins useful in the practice of the invention are homopolycarbonate, copolycarbonate and terpolycarbonate resins or mixtures thereof. Preferably, the (co)polycarbonate resins have molecular weights of 18,000–200,000 (weight average molecular weight), more preferably 20,000–80,000, and may alternatively be characterized by their melt flow of 1–65 gm/10 min. at 300° C. per ASTM D-1238. These (co)polycarbonates may be prepared, for example, by the known diphasic interface process from phosgene and dihydroxy compounds by polycondensation (see German DOS 2,063,050; 2,063,052; 1,570,703; 2,211,956; 2,211,957 and 2,248,817 and French Patent 1,561,518 and the monograph, H. Schnell, Chemistry and Physics of Polycarbonates, Interscience Publishers, New York 1964, all incorporated herein by reference).

In the present context, dihydroxy compounds suitable for the preparation of the (co)polycarbonates of the invention conform to the structural formulae (1) or (2)

(1)

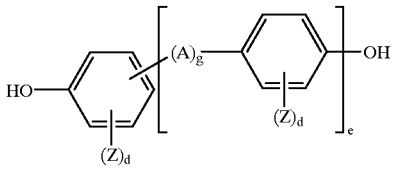

(2)

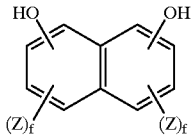

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, an —SO— or —$SO_2$- radical; or a radical of the general formula

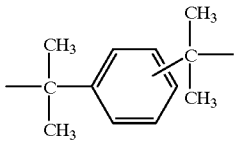

g denotes the number 0 or 1;

e denotes the number 0 or 1;

Z denotes F, Cl, Br or a $C_1$–$C_2$ alkyl and if several Z radicals are substituents in one aryl radical, they may be identical or different;

d denotes 0 or an integer of from 1 to 4; and f denotes 0 or an integer of from 1 to 3.

Among the useful dihydroxy compounds in the practice of the invention are hydroquinone, resorcinol, bis-(hydroxyphenyl)-alkanes, bis(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) 1,570,703; 2,063,050; 2,063,052; 2,211,956 and 2,211,957, in French Patent Specification 1,561,418 and in the monograph, H. Schnell, Chemistry and Physics of Polycarbonates, Interscience Publishers, New York, 1964. Further examples of suitable dihydroxy compounds are 2,2-bis-(4 -hydroxyphenyl)-propane(bisphenol A), 2,4-bis-(4-hydroxyphenyl)-2-methyl-butane, 1,1-bis-(4-hydroxyphenyl)-cyclohexane, 2,2,4-trimethylcyclohexyl 1,1-diphenol, α,α-bis-(4-hydroxyphenyl)-p-diisopropylbenzene, 2,2-bis-(3-chloro-4-hydroxyphenyl)-propane, hydroxybenzo-phenone and 4,4'-sulfonyl diphenol; the most preferred one is 2,2-bis-(4 -hydroxyphenyl)-propane(bisphenol A).

The (co)polycarbonates of the invention may entail in their structure, units derived from one or more of the suitable dihydroxy compounds.

The preparation of (co)polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

Monofunctional reactants, such as monophenols, may be used in the preparation of the (co)polycarbonate resins of the invention in order to limit their molecular weights. Also optionally used in the preparation of the (co)polycarbonate resin which is suitable for the preparation of laminates and/or the protective film of the invention are branching agents of the type described below. Branching may be obtained by the incorporation of small amounts, preferably of between about 0.05 and 2.0 mol % (relative to diphenols employed), of trifunctional or more than trifunctional compounds, especially compounds having three or more aromatic hydroxyl groups. Polycarbonates of this type are described, for example, in German Offenlegungsschriften (German Published Specifications) 1,570,533; 1,595,762; 2,116,974 and 2,113,347; British Specification 1,079,821 and U.S. Pat. No. 3,544,514 (incorporated herein by reference).

Some examples of compounds with three or more than three phenyl hydroxyl groups which can be used are phloroglucinol, 4,6 -dimethyl-2,4,6-tri-(4-hydroxyphenyl)-heptane, 2,4,6-trimethyl-2,4,6-tri-(4 -hydroxyphenyl)-heptane, 1,4,5-tri-(4-hydroxyphenyl)-benzene, 1,1,-tri-(4 -hydroxyphenyl)-ethane, tri-(4-hydroxyphenyl)-methane, 2,2-bis[4,4-bis-(4 -hydroxyphenyl)-cyclohexyl]-propane, 2,4-bis-(4-hydroxyphenylisopropyl)phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)-orthoterephthalic acid ester, tetra-(4-hydroxyphenyl)-methane tetra-(4-(4-hydroxyphenylisopropyl)phenoxy)-methane and 1,4-bis-((4',4"-dihydroxytriphenyl)-methyl)-benzene. Some of the other trifunctional compounds are 2,4-dihydroxybenzoic acid, trimesic acid cyanuric chloride and 3,3-bis-(4-hydroxyphenyl-2-oxo-2,3-dihydroindole.

Among the resins suitable in the practice of the invention are included phenolphthalein-based polycarbonates, copolycarbonates and terpolycarbonates such as are described in U.S. Pat. Nos 3,036,036 and 4,210,741, both incorporated by reference herein.

The bis-benzotriazole of the present invention conforms to formula (3).

(3)

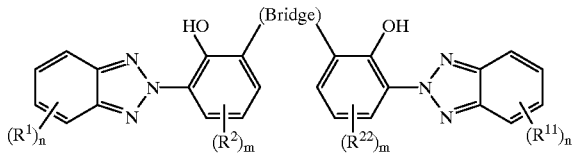

where ~~(Bridge)~~ is either

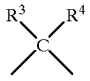

in which case it is preferred that the OH is in an ortho-position to the bridging group or —(bridge—)—is

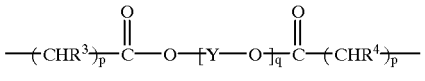

where p is an integer of 0 to 3, q is an integer of 1 to 10 and Y denotes

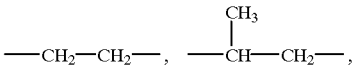

in which case it is preferred that the OH group be in a para-position to the bridging group. In the above formula $R^1$, $R^{11}$, $R^2$ and $R^{22}$ independent of each other are a hydrogen or a halogen atom, a $C_1$–$C_{12}$ alkoxy, $C_7$–$C_{18}$ arylalkoxy or a $C_1$–$C_{10}$ alkyl, cycloalkyl, aralkyl or an aryl radical and $R^3$ and $R^4$ independent of each other are a hydrogen atom, a $C_1$–$C_{10}$ alkyl, cycloalkyl, arylalkyl or an aryl radical, n is an integer of 0 to 4 and m is an integer of 1 to 3.

In a more preferred embodiment where —Bridge— is

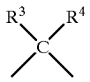

$R^3$ and $R^4$ are hydrogen atoms, n is O, m is 1 and $R^2$ is a tertiary octyl radical. Another preferred embodiment is represented by a bisbenzotriazole where—Bridge—denotes

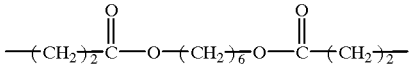

and is para-positioned to the OH groups and $R^2$ is a tertiary butyl, orthopositioned to the hydroxyl groups.

The most preferred dimeric benzotriazole suitable in the practice of the invention conforms structurally to

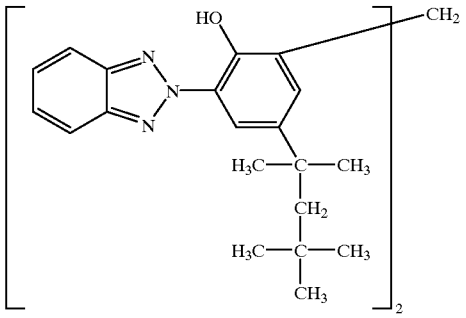

The stabilizer in the context of the invention is an ester of a 3,5-di-tert-butyl-4-hydroxyhydrocinnamic acid conforming structurally to

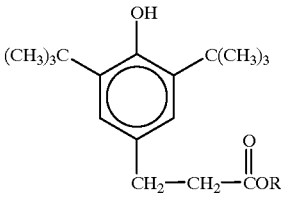

wherein R is a linear or branched $C_{1-24}$-alkyl radical, preferably $C_{14-22}$-alkyl radical. In a most preferred embodiment R is $—C_{18}H_{37}$.

The composition of the invention is free from organophosphorous compounds, and contains about 1.0 to 30, preferably about 1.0 to 15.0% of the bisbenzotriazole and about 0.1 to 5, preferably about 0.1 to 3.0% of the stabilizer, the percentages being relative to the weight of the composition.

The preparation of the inventive composition follows conventional procedures. The composition of the invention is suitable for the preparation of a variety of articles by thermoplastic molding, including extrusion and injection molding. Included among the applications for which the inventive composition is useful are sheets and laminates.

In a yet additional embodiment of the invention, a thermally stable laminate is prepared comprising a (co) polycarbonate sheet having a thickness of about 0.8 to 13.0 millimeter, and an adherent, protective film having a thickness of about 0.05 to 1.2 millimeter adherent to at least one surface of said sheet. The protective film is made of the inventive composition. In a preferred embodiment, the laminate is prepared by coextrusion of the sheet and protective film. Advantageously, the inventive composition of the protective film contains linear polycarbonate resin.

The laminate may be prepared conventionally, preferably by coextrusion in a known manner. It may be clear or pigmented, pigmentation attained by known means. Extrusion of polycarbonates as a method for forming sheets as well as coextrusion to form laminates are known and have previously been disclosed in the art.

In a preferred embodiment, the sheet and adherent layer are coextruded by known teachings and their surfaces are brought into contact at an elevated temperature resulting from the extrusion optionally in combination with the application of pressure, to effect adhesion resulting in the formation of a laminate.

The invention is further illustrated, but is not intended to be limited by the following examples in which all parts and percentages are by weight unless otherwise specified.

EXAMPLES

The exposure to HID light which normally causes discoloration in articles molded of (co)polycarbonate may be carried out in an exposure chamber known as "Whirly-GIG-III" available from Electrical Concepts Norh, 12800 Taylor Road Charlevoix, Mi. 49720. The chamber includes a rotating specimen rack, thermostatic heat control and a 400 watt metal halide lamp. Test plaques are positioned on the rotating platform so that they are exposed directly to the arc tube of the lamp. The platform rotates at one rpm around the stationary lamp. The plaques are positioned about 6 inches from the bulb. An external source of heat is provided for permitting the temperature of the test specimens to be in the range of 90°–130° C.

Experimental:

Compositions in accordance with the invention were prepared and their properties determined as noted below. In preparing the compositions of the invention and the control compositions, the resins and the additives which were used were as follows:

(i) Polycarbonate Resin: a bisphenol-A based homopolycarbonate having a melt flow rate of about 6.0 g/10 min. determined in accordance with ASTM D-1238; available as Makrolon 3108 resin, from Miles Inc.

(ii) Dimeric Benzotriazole conforming to (3)

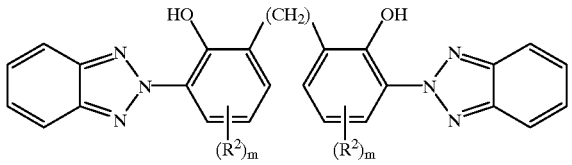

where $R^2$ denotes t-octyl group and m is 1.

(iii) as thermal stabilizer one of the following compounds was used:

(a) octadecyl 3,5-di-tert-butyl-4-hydroxyhydrocinnamate (herein HPA) conforming to

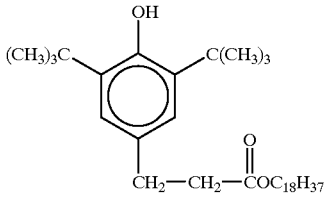

(b) 3,5-di-tert-butyl-4-hydroxyhydrocinnamic acid triester with 1,3,5,-tris(2-hydroxyethyl)-S-triazine-2,4,6,(1H,3H,5H)-trione (herein HPB) conforming to

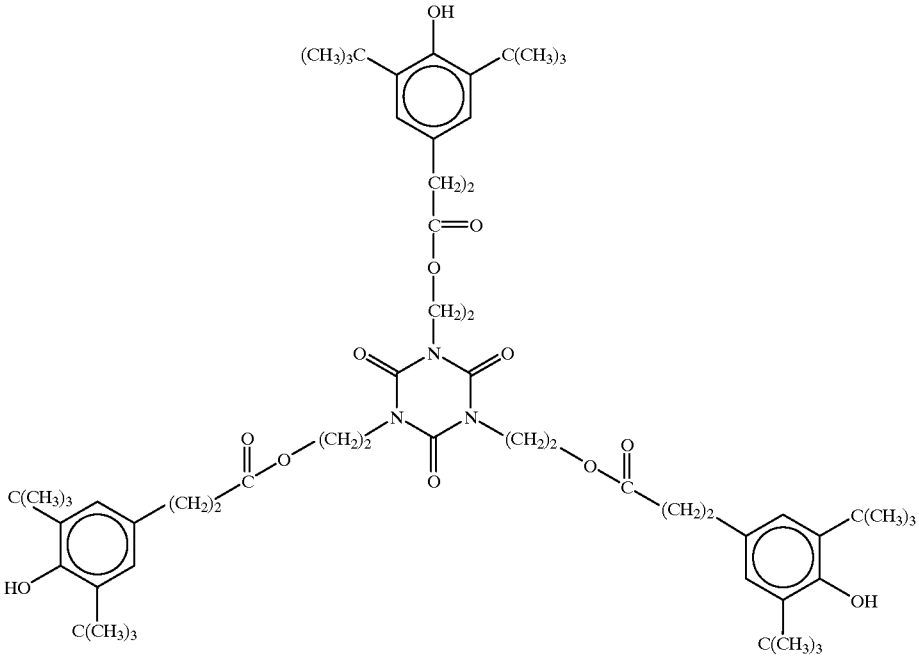

(c) thiodiethylene bis-(3,5-di-tert-butyl-4-hydroxy)-hydrocinnamate (herein HPC) conforming to

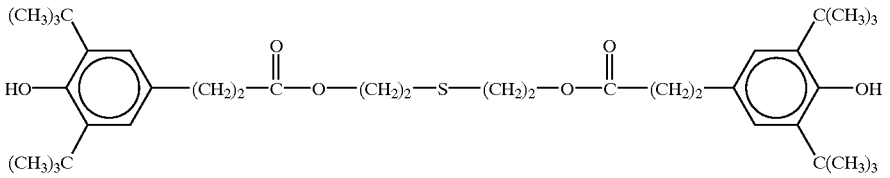

Each of protective films A1 to A4 in the tables below contained 10% of the dimeric benzotriazole and A2, A3 and A4 also contained 1% of the noted stabilizer, as indicated in the table. The noted percents are relative to the weight of the composition. Laminates of protective films and protected sheets were prepared by conventional methods which are well known in the art. The protective films (5 mils in thickness) made of the noted compositions were applied to the protected sheets, that is polycarbonate substrates (100 mils in thickness) to produce laminates. The laminates were exposed to HID at 105° C. for 2000 hours and the yellowness indices determined periodically as noted in Table 1 below.

TABLE 1

| yellowness index of the laminate (protected sheet) after exposure to HID for the indicated number of hours | | | | | |
|---|---|---|---|---|---|
| laminate | 0 | 1000 | 1500 | 2000 | $\Delta Y.I_{2000}$ |
| A1 | 3.1 | 7.0 | 24.0 | 36.8 | 33.7 |
| A2-HPA | 4.4 | 11.4 | 17.0 | 24.8 | 20.4 |
| A3-HPB | 4.1 | 9.4 | 25.5 | 38.6 | 34.5 |
| A4-HPC | 3.6 | 9.1 | 24.4 | 35.8 | 32.2 |

Clearly the effectiveness of protective films made of the composition of the invention is demonstrated by the results shown above. The laminate designated A2-HPA shows a considerably greater resistance to yellowing than do any of the other laminates.

Table 2 below reports the results of evaluation of the composition of the invention as protective film of substrate made of a copolycarbonate resin. The copolycarbonate used in this series of experiments was one derived from 65 mol % bisphenol A and 35 mol % of trimethylcyclohexane bisphenol. The resin has a melt flow rate of about 4.0 g/10 min. at 320° C. as determined in accordance with ASTM D 1238. The resin is available commercially from Miles Inc. as Apec HT DP9-9350 resin.

The compositional makeup of the protective film was as noted above for the series reported in Table 1. The laminates (protected sheets) were exposed to HID at 120° C. for 2000 hours and the yellowness indices determined periodically as noted below.

TABLE 2

| yellowness index of the laminates (protected sheets) after exposure to HID for the indicated number of hours | | | | | |
|---|---|---|---|---|---|
| laminate | 0 | 1000 | 1500 | 2000 | $\Delta Y.I_{2000}$ |
| C1 | 8.6 | 19.6 | 42.3 | 74.4 | 65.8 |
| C2-HPA | 8.2 | 14.0 | 23.4 | 39.6 | 31.4 |

TABLE 2-continued

| yellowness index of the laminates (protected sheets) after exposure to HID for the indicated number of hours | | | | | |
|---|---|---|---|---|---|
| laminate | 0 | 1000 | 1500 | 2000 | $\Delta Y.I_{2000}$ |
| C3-HPB | 8.1 | 21.3 | 44.9 | 75.2 | 67.1 |
| C4-HPC | 7.8 | 21.0 | 43.7 | 74.1 | 66.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition free from organic phosphorous compounds, comprising [polycarbonate] (*co*) *polycarbonate* resin *the structure of which entail units derived from one or more bis*(*hydroxyphenyl*)-*cycloalkane* and (i) about 1.0 to 30 percent of a bis-benzotriazole conforming structurally to

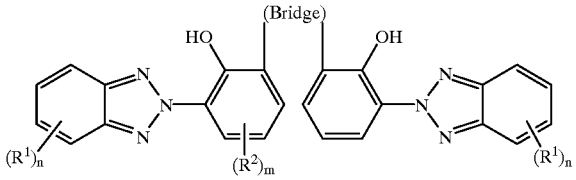

wherein $R^1$ and $R^2$ independent of each other are a hydrogen or a halogen atom, a $C_1$–$C_{12}$ alkoxy, $C_7$–$C_{18}$ arylalkoxy or a $C_1$–$C_{10}$ alkyl, cycloalkyl, arylalkyl or an aryl radical and (Bridge) is either

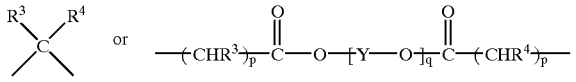

where p is 0 to 3, q is 1 to 10, Y denotes any of —$CH_2$—$CH_2$—,

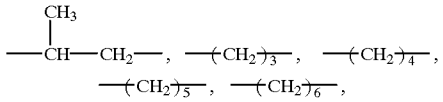

$R^3$ and $R^4$ independent of each other are a hydrogen atom, a $C_1$–$C_{10}$ alkyl, cycloalkyl, arylalkyl or an aryl radical, and (ii) about 0.1 to 5.0 percent of a stabilizer conforming to

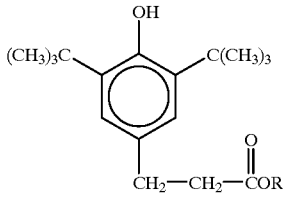

wherein R is a linear or branched $C_{1-24}$-alkyl radical, said percent, both occurrences, being in relation to the weight of said composition.

2. The thermoplastic molding composition of claim 1 wherein said (i) is present in an amount of about 1.0 to 15 percent, and said (ii) is present in an amount of about 0.1 to 3.0 percent, said percent, both occurrences, being in relation to the weight of said composition.

3. The composition of claim 1 wherein said benzotriazole conforms to

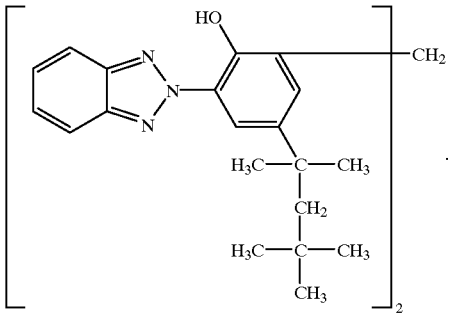

4. The composition of claim 3 wherein said stabilizer conforms to

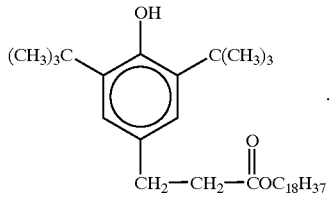

5. A thermally stable laminate comprising (a) a (co)polycarbonate sheet having a thickness of about 0.8 to 13.0 millimeter, and (b) a protective film having a thickness of about 0.05 to 1.2 millimeter adherent to at least one surface of said sheet, containing the composition of claim 1.

6. The laminate of claim 5 prepared by co-extrusion.

7. A thermally stable laminate comprising (a) a (co)polycarbonate sheet having a thickness of about 0.8 to 13.0 millimeter, and (b) a protective film having a thickness of about 0.05 to 1.2 millimeter adherent to at least one surface of said sheet, containing the composition of claim 3.

8. The laminate of claim 7 wherein the stabilizer conforms to

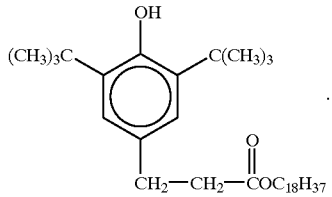

9. The laminate of claim 7 made by co-extrusion.

10. The laminate of claim 8 made by co-extrusion.

*11. The thermoplastic molding composition of claim 1 wherein said units are derived from at least one member selected from the group consisting of 1,1-bis-(4-hydroxyphenyl)-cyclohexane and 2,2,4-trimethylcyclohexyl 1,1-diphenol.*

* * * * *